Feb. 7, 1967  M. B. E. FANT  3,302,327
FLOWER FROG FRAME
Filed April 6, 1964  3 Sheets-Sheet 1

INVENTOR

Mrs. Mae Belle Esco Fant

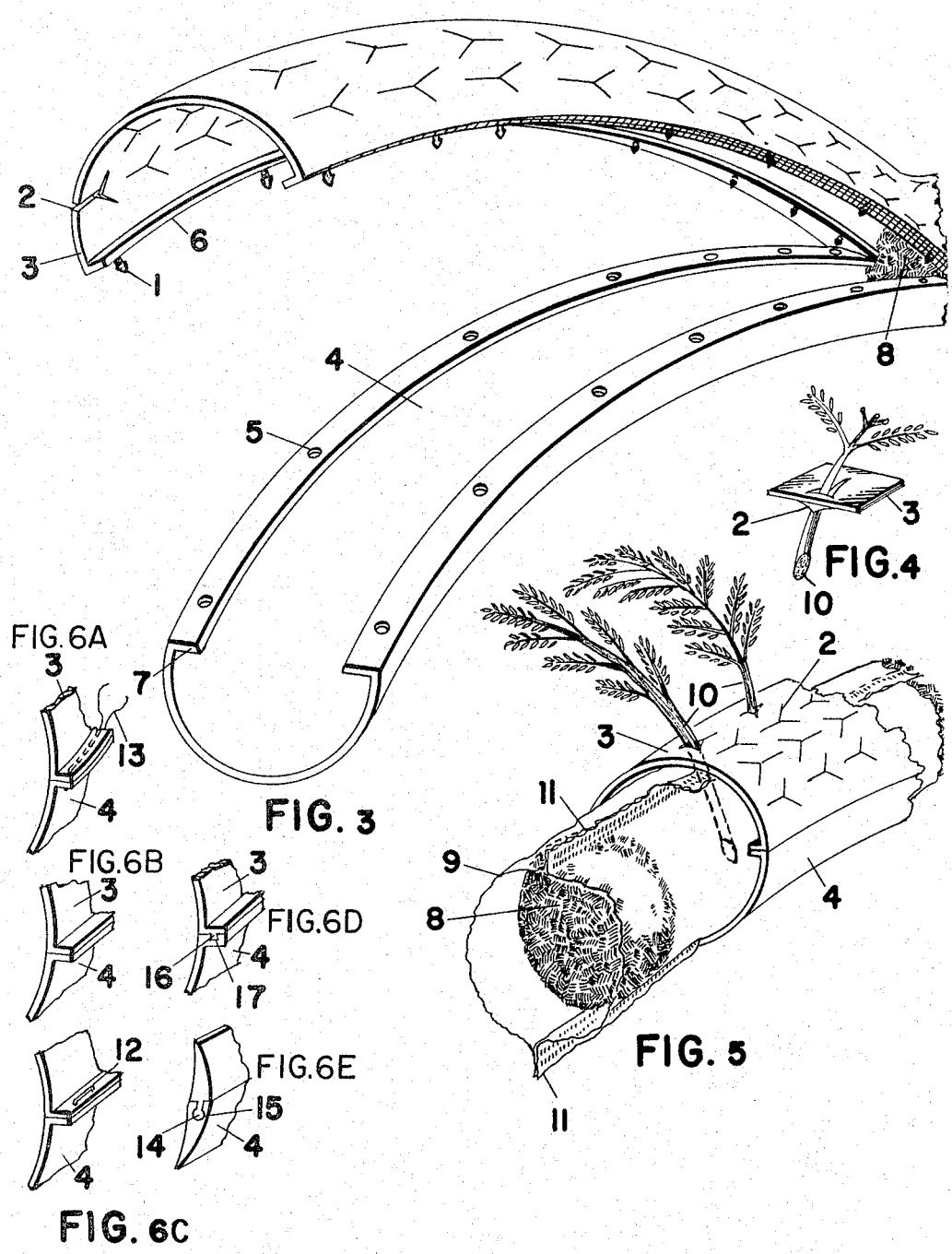

Feb. 7, 1967  M. B. E. FANT  3,302,327
FLOWER FROG FRAME

Filed April 6, 1964  3 Sheets-Sheet 3

INVENTOR
Mrs. Mae Belle Esco Fant

United States Patent Office

3,302,327
Patented Feb. 7, 1967

3,302,327
FLOWER FROG FRAME
Mae Belle Esco Fant, 214 McSwain Drive,
Greenville, S.C. 29607
Filed Apr. 6, 1964, Ser. No. 357,589
2 Claims. (Cl. 47—41.12)

The present invention relates generally to flower frogs and frames and more particularly to a novel "flower frog frame" to be used to hold flowers for various occasions.

The improvements and advantages of the present invention over the frames and frogs that are on the market today will be clearly explained throughout the description. The present invention contemplates a flower frog frame that will hold sufficient moisture to keep flowers fresh for a long period, especially wreaths and floral arrangements used for funerals and special holiday arrangements used for door decorations. This flower frame serves as a frog and frame which allows the stems of a flower to be inserted into the frame and be kept wet and which therefor also will hold the flower securely in position regardless of the angle the flower is held or hung, which sometimes is a vertical position.

It is an object of the present invention to provide a wet flower frog frame to hold flowers in any position, having the frame made of a pliable material for the top and a more rigid material for the bottom, water repellent and self supporting, and designed to keep flowers fresh for the length of the life of cut flowers.

Another object of the invention is to provide a flower frog frame designed primarily to hold vermiculite, or any inert filler material, which will hold water and will not release it regardless of the position of the frame. Such a flower frog frame may be used as holiday wreaths hung on doors or to hold flower arrangements used for funerals. These are suggestions for the use of the frame, however, they can be used for cut flowers in any designed shape frame for other occasions.

Another object of this invention is to provide a flower frog frame designed to hold and grip flowers serving as a frog holding flowers in a fixed position.

A further object of the invention is to provide a flower frog frame to hold cut flowers with preformed slits or openings in the top and on the sides of the frame that will expand and let the stems of flowers, regardless of the size of the stems, be inserted through the opening and on into the vermiculite inside the frame without damage to the stems of the flowers. The grip action of the opening will firmly hold the stems of the flowers but will in no way damage the flowers.

Some of the frames that are being used and sold on the market are not designed to hold moisture, therefore the flowers wilt very rapidly. The frames are made of straw wrapped with tape and cannot retain water or even be put in water without coming apart and collapsing. The wire frames presently being used by the florist operators have to be packed with straw or such and then wrapped with paper or tape to conceal the mechanics, these being impractical for holding water, also. Both of these designs are used by the florist operator wiring a stick to the flower and only the stick is inserted into the frames leaving the flower entirely outside the frame, consequently, this is the reason flower arrangements made on these frames used for funerals and such wilt the first day an arrangement is made.

The present invention is an improvement over the existing frames, which comprises therefor a box without any means provided for inserting a flower. It is time consuming for the florist operator to punch holes for various sizes of stems in each arrangement to be able to hold the stems of flowers when making a number of arrangements.

The frames and frogs in my invention are rigid and will support the weight of an entire arrangement without collapsing and will also hold enough moisture to keep flowers fresh. The frame can be packed with a number of water absorbable substances serving as an oasis, however, the one suggested to be used in this invention is vermiculite because of its high capillary action in holding and retaining water, and therefore its weight when dry is very light and will not add much to the weight of a filled frame or arrangement.

The foregoing along with other objects and advantages will be apparent from the following descriptions as illustrated by the accompanying drawings in which:

FIG. 3 shows a portion of the frame FIG. 1 disassembled before being filled with vermiculite.

FIG. 4 shows a section of the top of the frame FIG. 1 with an illustration of a stem of a flower inserted through and being gripped by one of the therefor substantially Y shaped openings therefor.

FIG. 5 is a section of FIG. 1 assembled and showing plant stems inserted through the openings and on into the vermiculite.

FIGS. 6A–6E show different means therefor of putting the top and bottom together.

Figures 1, 2:
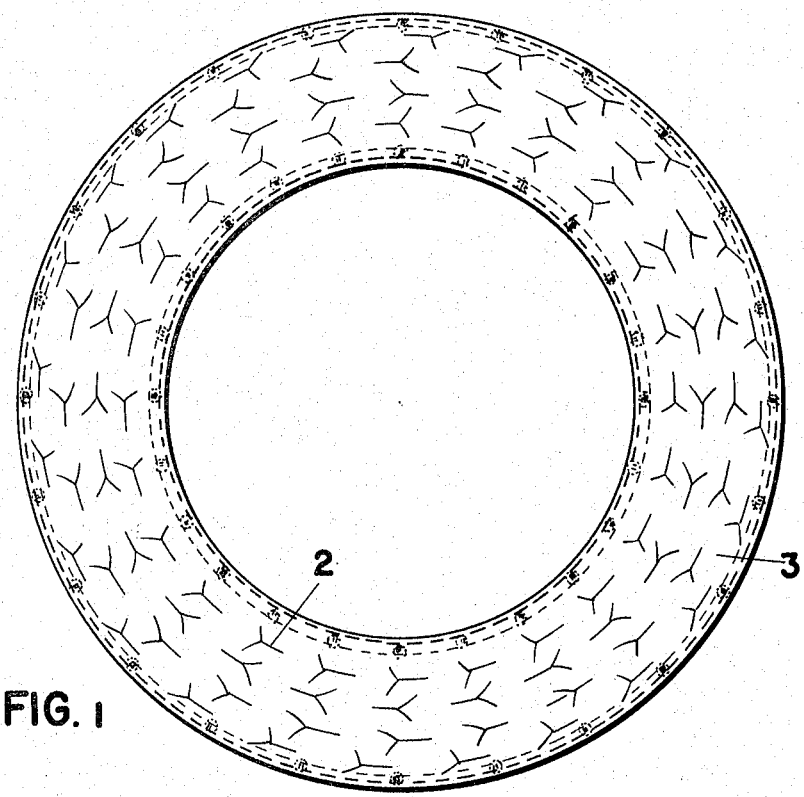
FIG. 1 is the top of a round design flower frame showing substantially Y shaped openings.
FIG. 2 shows a half section of FIG. 1 showing the top and bottom assembled and packed with vermiculite.

Attention is directed to the drawings of which:

FIG. 1 shows a completely assembled and filled round design flower frog frame. This frame is made to hold the stems of cut flowers, providing preformed openings 2 substantially Y shaped in design. The top of this frame is made of a pliable material that will allow the openings to expand to the size of the stems when the stems are inserted through the openings and pushed on into the wet vermiculite inside the frame. Any size flower stem practical for such an arrangement may be used in this frame. The preformed openings 2 will hold the flowers in any desired design and the stem of the flower may be inserted through the openings from any angle desired and the openings will firmly grip and hold the flower stems in that fixed position.

FIG. 2 is a half section of FIG. 1 showing the top 3 and the bottom 4. The flange edges of top 3 and the bottom 4 are snapped together and held securely by pegs 1 and holes 5 as shown in FIG. 3. Vermiculite 8 is used as a filler material packed inside the frame. The substantially Y shaped openings therefor will expand and receive the stems of flowers 10 as shown in FIG. 4 and will hold the flowers regardless of the position of the frame, which may sometimes be in a vertical position when being used.

The bottom 4 of the frame shown in FIG. 2 is made of a strong water repellent synthetic material designed to mate with the top 3. The bottom 4 is snapped to the top 3 by pressing the holes 5 on the flange 7, FIG. 3 onto the pegs 1 of the flange 6, FIG. 3, holding the top and bottom of the frame securely together. The bottom is made of a material, water repellent, sufficient in strength to hold the weight of a finished arrangement, and keep the original shape of the frame.

Several means are disclosed for holding the flanges of the top and bottom of the frog frame together. The flanges of the top and bottom of the frog frame are shown sewn together by thread 13 in FIGURE 6A, cemented or heat sealed together in FIGURE 6B, stapled together with a staple 12 in FIGURE 6C, held together by a dove tail 16 and groove 17 means in FIGURE 6D, held together by a round tongue 14 and groove 15 means in FIGURE 6E.

Figure 7:
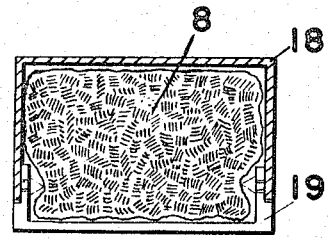
FIG. 7 is a section of a rectangular frame that would be part of a cross design as shown in FIGS. 8 and 9, assembled and filled with vermiculite.

The vermiculite 8 in FIGS. 2, 5 and 7 is an expanded inert granular material patented by W. R. Grace Inc., having the trademark "Zonolite," sold in bulk form at many supply and retail stores. The inert granules may be prepacked in bulk form in a film tubing 9, the tubing being either seamless or sealed as shown at 11 in FIG. 5. The filled tubing may be placed inside the flower frame, as shown in FIGURE 5, or the inert granules may be placed or packed without the tubing as shown in FIG. 2. When using the synthetic plastic film tubing to hold the vermiculite. The tubing may be formed from syn- formed openings on the top of the frame so as to have free passage of the flower stem through the tubing into the vermiculite. The tubing may be formed from synthetic plastic film.

The uniqueness of the present invention can be appreciated by having the openings preformed for the florist operator, saving much time for him during rush hours when making many pieces for an appointed hour. These frames can be presoaked also by the operator and kept on hand, and also will allow the operator to make arrangements long before an appointed hour giving him more time to use his art, with greater satisfaction to himself and to his customers.

FIGURE 7 shows a portion of a square edge top 18 and bottom 19. This design shows the top of the frame overlapping the bottom with pegs 1 FIG. 8 on the inside of the sides in a horizontal position to be pressed into the holes 5 FIG. 9 of the bottom so as to have a smooth edge on the outer side of the frame. This method of holding the top and bottom together is practical for any of the other designs described but is of imporance when making frames in the shape of a cross because in using this design frame the frame is not always covered completely with flowers and smooth edges are more desirable.

Figure 8:
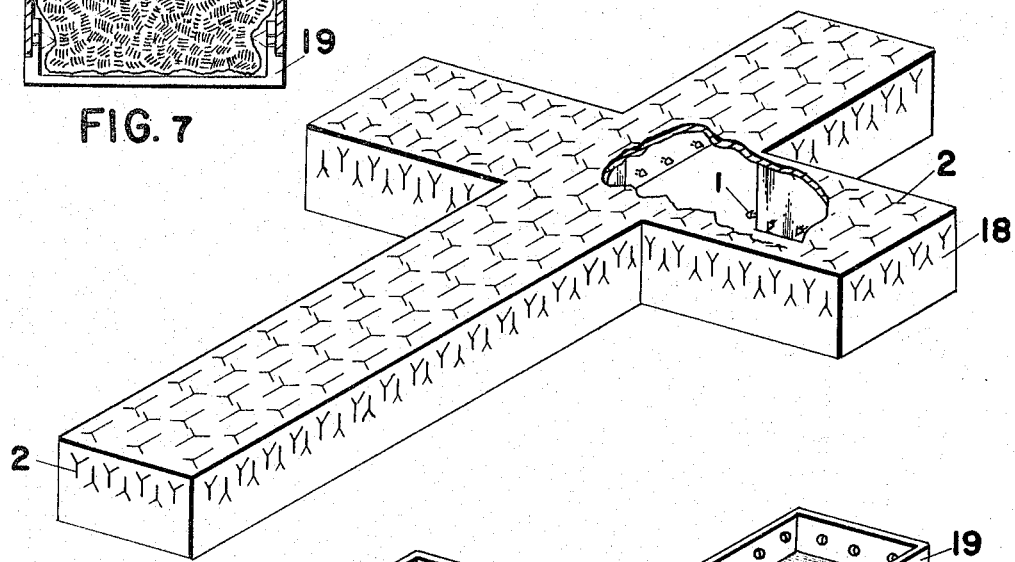
FIG. 8 is a top of a cross design frame having openings substantially Y shaped in design staggered over the top and sides. The cut-away section illustrates the location of the pegs that are used to hold the top and bottom sections together.

FIGURE 8 shows the top of a square edge frame design in the shape of a cross. The pegs 1 are in a horizontal position on the inside of the top 18 of the frame. The top is made as described for the round design frame with the exception of the position of the pegs and shape.

Figure 9:
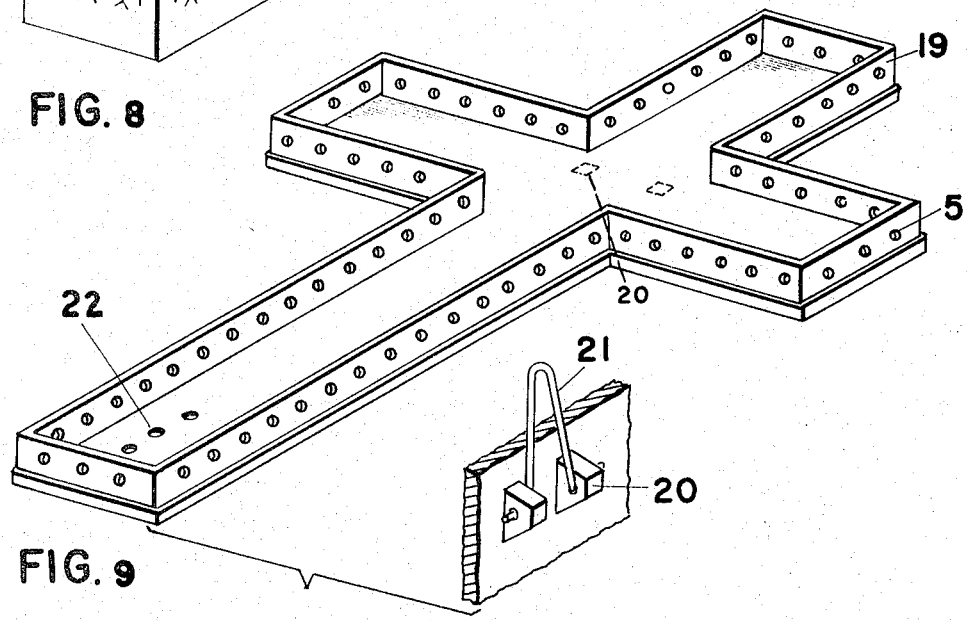
FIG. 9 is the bottom half of a cross design frame, which mates with the top FIG. 8 having holes on the sides to receive the pegs in FIG. 8.

FIGURE 9 shows the bottom of the cross design FIG. 8. The bottom 19 is also made as described for the round frame with the exception of the holes 5 which are made on the side of the frame to receive the pegs 1 of the top of the frame, and the shape.

All of the frames or the ones that would require supporting in a vertical position, or hanging may be equipped with means for convenience for hanging. The frame can be supported on the funeral directors equipment when provided, but when this equipment is not present a hook 21 substantially V-shaped design is held by a lug or lugs 20 that are provided on the back of the frame.

It should be noted that the exact composition, configuration, uses, structure, and bonding together of the component parts of the present invention may vary or be modified, such as not wetting the frame where artificial flowers are used, or by changing the shape of the frame where cut flowers are used, or by adding to the designs or changing the shape of the openings would still remain within the scope of the present invention of a flower frog frame with preformed openings encasing an inert material water absorbable with capillary action to hold the stems of flowers in a fixed arrangement or in preserving cut flowers by this method.

I claim:
1. A flower frog frame comprising an encasement, said encasement comprising:
   (a) top and bottom portions,
   (b) said portions being connected together to form a void therewithin,
   (c) said void being filled with vermiculite for receiving water and holding the same by capillary action,
   (d) said top portion being made of a pliable resilient material provided with substantially Y-shaped flower stem receiving slits having normally closely abuting edges,
   (e) said bottom being made of a substantially rigid material and provided with preformed openings for drainage of excess water, and
   (f) hook means attached to said bottom portion for hanging the encasement.
2. A flower frog frame comprising an encasement, said encasement comprising:
   (a) top and bottom portions,
   (b) said portions being connected together to form a void therewithin,
   (c) said void being filled with vermiculite for receiving water and holding same by capillary action,
   (d) said void being filled with vermiculite in bulk form or by filling said void with vermiculite packed in a film tubing, said film tubing being provided with preformed openings or slits to mate with the preformed openings of said outer encasement,
   (e) said top portion of outer encasement being made of a pliable resilient material provided with substantially Y-shaped flower stem receiving slits have normally closely abutting edges,
   (f) said bottom portion being made of a substantially rigid material and provided with preformed openings for drainage of excess water, and
   (g) hook means attached to said bottom portion for hanging the encasement.

References Cited by the Examiner

UNITED STATES PATENTS

| | | | |
|---|---|---|---|
| 1,344,526 | 6/1920 | Tilney | 47—41.11 |
| 1,611,589 | 12/1926 | Janusek | 47—41.12 X |
| 2,218,157 | 10/1940 | Seidel | 47—41.11 |
| 2,366,377 | 1/1945 | Zois | 47—41.12 |
| 2,416,136 | 2/1947 | Arlington | 47—41.12 |
| 2,543,153 | 2/1951 | Cowart | 47—41.12 |
| 2,761,233 | 9/1956 | Brown | 47—41.12 X |
| 2,904,933 | 9/1959 | King | 47—41.12 |

FOREIGN PATENTS 22,557  1/1910  Great Britain.

ABRAHAM G. STONE, *Primary Examiner.*

JOE O. BOLT, JR., *Examiner.*

J. R. OAKS, *Assistant Examiner.*